United States Patent [19]

Suzuji et al.

[11] Patent Number: 4,980,811
[45] Date of Patent: Dec. 25, 1990

[54] POWER SOURCE APPARATUS

[75] Inventors: Koji Suzuji; Hajime Motoyama; Joji Nagahira, all of Yokohama, Japan

[73] Assignee: Canon Kabushiki Kaisha, Tokyo, Japan

[21] Appl. No.: 407,714

[22] Filed: Sep. 14, 1989

Related U.S. Application Data

[63] Continuation of Ser. No. 98,143, Sep. 18, 1987, abandoned.

[30] Foreign Application Priority Data

| Sep. 20, 1986 | [JP] | Japan | 61-222711 |
| Sep. 20, 1986 | [JP] | Japan | 61-222712 |
| Nov. 28, 1986 | [JP] | Japan | 61-281679 |
| May 29, 1987 | [JP] | Japan | 62-131845 |
| Aug. 13, 1987 | [JP] | Japan | 62-200816 |
| Aug. 13, 1987 | [JP] | Japan | 62-200817 |
| Aug. 13, 1987 | [JP] | Japan | 62-200818 |

[51] Int. Cl.⁵ .................. H02M 3/335; G05F 1/325
[52] U.S. Cl. .................... 363/21; 363/75; 323/250; 323/331; 323/361; 323/362
[58] Field of Search .......... 363/21, 75, 95, 131; 323/250, 308, 331, 361, 362

[56] References Cited

U.S. PATENT DOCUMENTS

| 3,584,288 | 6/1971 | Boehm | 363/75 |
| 4,346,340 | 8/1982 | Hackett-Jones | 323/362 |
| 4,386,311 | 5/1983 | Bafaro | 363/21 |
| 4,473,817 | 9/1984 | Perkins | 363/361 |
| 4,524,411 | 6/1985 | Willis | 363/21 |
| 4,562,522 | 12/1985 | Adams et al. | 363/21 |
| 4,604,556 | 8/1986 | Haferl | 363/75 |
| 4,709,321 | 11/1987 | Trantham | 363/21 |

FOREIGN PATENT DOCUMENTS

| 0140580 | 5/1985 | European Pat. Off. |
| 0196907 | 10/1986 | European Pat. Off. |
| 211978 | 12/1982 | Japan |
| 72730 | 4/1983 | Japan |

Primary Examiner—Steven L. Stephan
Assistant Examiner—Emanuel Todd Voeltz
Attorney, Agent, or Firm—Fitzpatrick, Cella Harper & Scinto

[57] ABSTRACT

A power source apparatus includes a transformer having a plurality of paired winding portions of primary and secondary windings wound around cores divided by a gap, a driver, connected to the primary winding of the paired winding portion, for switching energization of the primary winding of the transformer to generate a secondary winding voltage, and a selector for selectively driving one of the plurality of paired winding portions.

25 Claims, 14 Drawing Sheets

POWER SOURCE APPARATUS

This application is a continuation of application Ser. No. 098,143, filed Sept. 18, 1987 now abandoned.

BACKGROUND OF THE INVENTION

The present invention relates to a power source apparatus for extracting a plurality of voltage outputs from a single transformer.

In a conventional copying machine, a printer or the like of an electrophotographic system, a sequence control low voltage power source apparatus, an exposure power source apparatus, and a charging high voltage source apparatus are separately used. For example, the charging high voltage power source apparatus is arranged such that a stabilized low voltage output (normally, 24 V) is boosted to a voltage of 5 to 9 kV by a DC/DC inverter. FIG. 20 shows an arrangement of the charging high voltage power source apparatus.

The power source apparatus includes a converter transformer T. An AC voltage from a commercial power source 503 is rectified and smoothed by a rectifying/smoothing circuit 502 and the resultant DC voltage is applied to a primary winding 501 of the converter transformer T. The DC voltage is driven and turned on/off in response to a switching pulse generated by a PWM (Pulse Width Modulation) control circuit 504. A damper diode D61 and a resonance capacitor C60 are connected in parallel with a transistor Q60. The ON/OFF operation of the DC voltage derives an output in accordance with a winding ratio of secondary windings 521 and 522 of the transformer T.

In the power source apparatus, low voltage outputs appear at the secondary windings 521 and 522 and are rectified by rectifying diodes D62 and D63 and smoothed by smoothing capacitors C61 and C62, thereby obtaining a low voltage DC output. A high voltage DC output is obtained by boosting the low voltage DC output by DC/DC converters 505 and 506. This arrangement aims at obtaining a stable high voltage output regardless of variations in the low voltage output.

In the above arrangement, transformers are used in both DC/DC converters 505 and 506. The numbers of transformers and driving circuits used in the power source apparatus are large, and resulting in a bulky power source apparatus at high cost. In addition, power efficiency is also degraded. These disadvantages are common in power source apparatuses used in various types of equipment in addition to the power sources for electrophotographic apparatuses.

As described in U.S. patent application Ser. No. 904,810, a method of integrating the transformers is proposed. However, as soon as the power switch is turned on, a high voltage output is generated, and high voltage control is difficult. In addition, a safety problem is also presented.

SUMMARY OF THE INVENTION

The present invention has been made in consideration of the above situation, and has as its object to provide an improved power source apparatus.

It is another object of the present invention to provide a simple, compact power source apparatus capable of outputting plural types of outputs.

It is still another object of the present invention to provide a low-cost power source apparatus.

It is still another object of the present invention to provide a power source apparatus whose power efficiency can be improved.

It is still another object of the present invention to provide a safe power source apparatus.

The above and other objects, features, and advantages of the present invention will be apparent from the following detailed description in conjunction with the accompanying drawings.

BRIEF DESCRIPTION OF THE DRAWINGS

FIGS. 16(A) to 16(C) and FIGS. 17(A) to FIG. 17 (C) are timing charts of voltage signals generated by the circuit components in the circuit shown in FIG. 15;

DETAILED DESCRIPTION OF THE PREFERRED EMBODIMENTS

Figure 1:
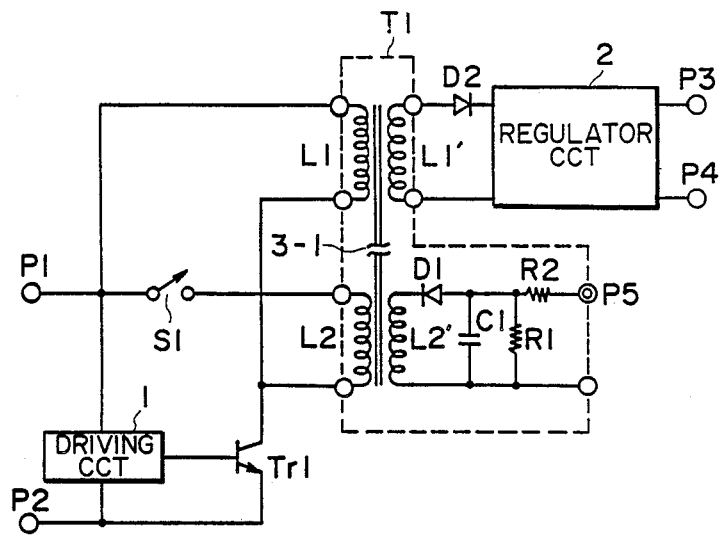
FIG. 1 is a block diagram of a power source apparatus according to an embodiment of the present invention.

Preferred embodiments of the present invention will be described with reference to the accompanying drawings. FIG. 1 shows a power source apparatus according to an embodiment of the present invention. This power source apparatus includes a driving circuit 1 for a switching transistor Tr1 in a power source converter transformer T1 and a regulator circuit 2 for a sequence control power source (24 V in this embodiment). In the converter transformer T1, a low voltage paired winding portion of a primary winding L1 and a secondary winding L1' is isolated from a high voltage paired winding portion of a primary winding L2 and a secondary winding L2' by a gap 3-1. A high voltage secondary winding L2', a high voltage diode D1, and a high voltage capacitor C1 cooperate to output a high voltage at a high voltage terminal P5.

When a power switch is turned on, the primary winding L1 is energized. Since the secondary winding L1' is magnetically coupled to the primary winding L1, an output of about 26 to 29 VRMS appears across the terminals of the secondary winding L1'. This output is rectified by a diode D2, and the rectified output is stabilized by the regulator circuit 2 to a voltage of 24 V. The voltage of 24 V is applied to a sequence control circuit through output terminals P3 and P4.

In this state, a switch S1 is kept open, and the primary winding L2 is not energized. Only a leakage component of the magnetic flux by the primary winding L1 appears through the gap 3-1 at the secondary winding L2' magnetically coupled to the primary winding L2. Therefore, a high voltage output at the terminal P5 is decreased.

A sequence control circuit (not shown) is operated to set a high voltage generating timing and outputs a predetermined control signal. In this state, the switch S1 is turned on.

The switch S1 comprises, e.g., a microswitch or an electronic switch.

When the switch S1 is turned on, the primary winding L2 is energized and a high voltage is induced by the secondary winding L2' magnetically coupled to the primary winding L2. Therefore, a DC voltage required for image formation is supplied to a charger through the terminal P5.

Figure 2:
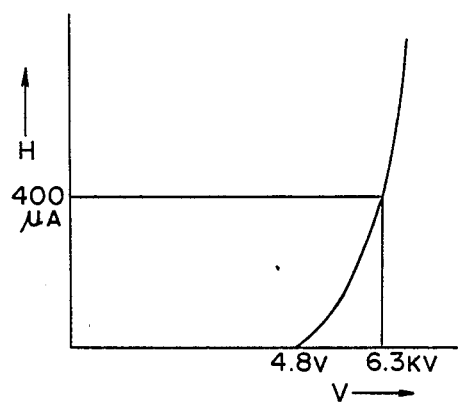
FIG. 2 is a graph showing voltage vs. current characteristics of a charger.

FIG. 2 shows the current vs. voltage characteristics of the charger. The operating point during image formation is set at 6.3 kV (400 μA), while the current is zero at a voltage of 4.8 kV. When the voltage is 4.8 kV or less, no influence is imposed on a photosensitive drum.

When the switch S1 is kept off, the high voltage output is set at 4 kV or less. Even if a high voltage output is generated upon operation of the power switch, the photosensitive drum is not adversely affected.

Figure 3:
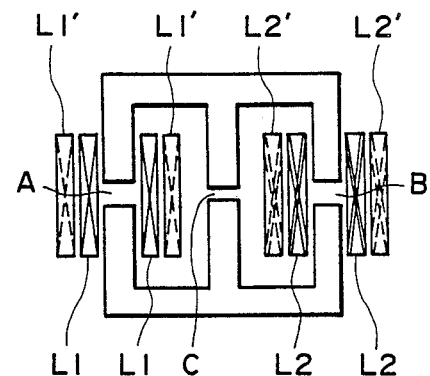
FIG. 3 is a sectional view of a converter transformer T1 shown in FIG. 1.

FIG. 3 shows an actual structure of the windings of the transformer T1.

The gap 3-1 in FIG. 1 is constituted by gaps of the A, B, and C portions. The gap of the C portion is smaller than that of each of the A and B portions. When the switch S1 is kept off, i.e., when the primary winding L2 is deenergized, a voltage induced by the corresponding secondary winding L2' is decreased.

Figure 4:
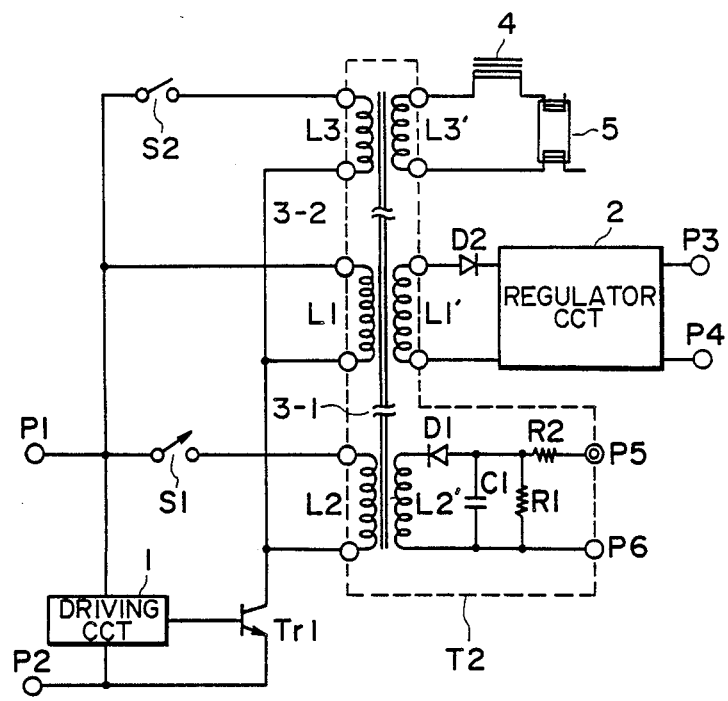
FIG. 4 is a block diagram of a power source apparatus according to another embodiment of the present invention.

FIG. 4 is a circuit diagram wherein a paired winding portion of primary and secondary windings L3 and L3' is added and a fluorescent lamp 5 is energized. When a switch S2 is turned on and the primary winding L3 is energized, a voltage required to turn on the fluorescent lamp 5 is induced by the secondary winding L3' magnetically coupled to the primary winding L3. The voltage is applied to the fluorescent lamp 5 through a choke coil 4. However, when the switch S2 is kept open, most of the magnetic fluxes upon energization of the primary winding L2 are blocked by a gap 3-2. A voltage induced by the secondary winding L3' does not reach the ON voltage of the fluorescent lamp 5. As a result, the fluorescent lamp 5 is not turned on.

Figure 5:
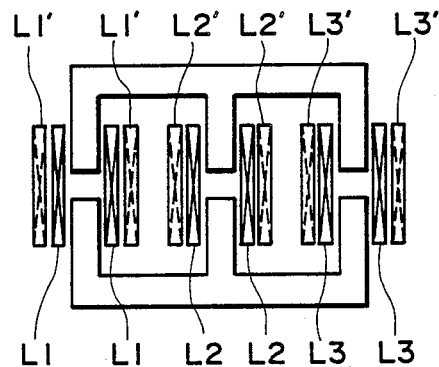
FIG. 5 is a sectional view of a converter transformer T2 shown in FIG. 4.

FIG. 5 shows an actual structure of the windings of a transformer T2 in FIG. 4.

As is apparent from the above description, low and high voltages can be applied from a single transformer, and the high voltage output timing can be controlled in response to a sequence signal.

As shown in FIG. 4, the exposure voltage can be applied and at the same time the exposure lamp can flicker in response to the sequence signal.

Still another embodiment of the present invention will be described with reference to FIG. 6. In this embodiment, a high voltage output winding and a high voltage control winding are arranged in a high voltage section and a current flowing through the high voltage control winding is controlled, thereby controlling the high voltage output. The same reference numerals as in FIG. 1 denote the same parts in FIG. 6. A current flowing through a high voltage control winding L2'' is changed to control a high voltage output from a secondary winding L2'.

When a power switch is turned on, a primary winding L1 is energized. Since a secondary winding L1' is magnetically coupled to the primary winding L1, an output of about 26 to 29 VRMS appears across the terminals of the secondary winding L1'. This output is rectified by a diode D2, and the rectified signal is stabilized by a regulator circuit 2 to a voltage of 24 V. The voltage of 24 V is applied to a sequence control circuit through output terminals P3 and P4. In this case, a switch S1 is kept open, and the magnetic fluxes of the cores having the windings L2, L2', and L2'' thereon are sufficiently attenuated by a gap 3-1. The windings L2, L2', and L2'' are closely coupled to each other, as shown in FIG. 3. The winding L2' is a high voltage winding, and the winding L2'' is a control winding for controlling a high voltage output from the winding L2'.

In the noncopy mode, a transistor Tr2 is turned on in response to a control signal input to a terminal P6, and an induction voltage applied to the winding L2 is greatly decreased. Therefore, a high voltage output is set at 1 kV or less. In the copy mode, the sequence control circuit is operated to turn on the switch S1. At the same time, the transistor Tr2 is turned off, and energization of the winding L2 induces a predetermined high voltage in the winding L2'. Therefore, the DC high voltage required for image formation is applied to a charger through the terminal P5.

Figure 6:
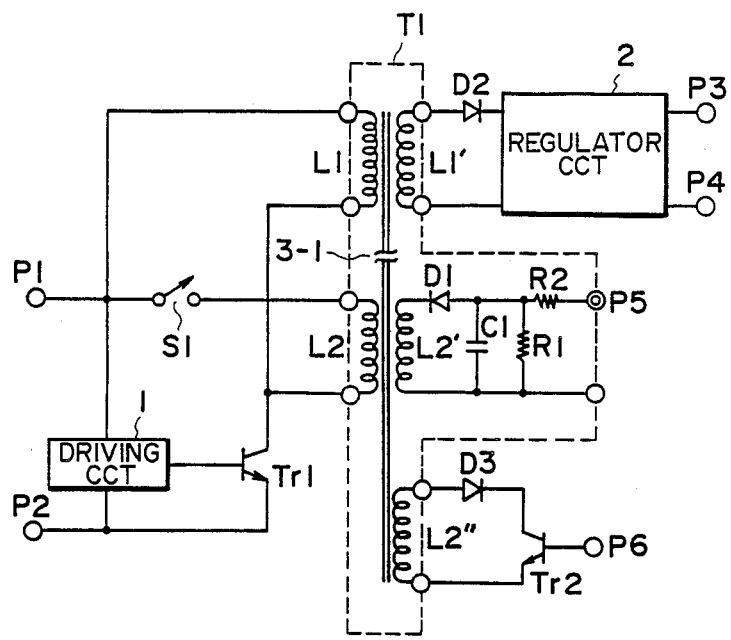
FIG. 6 is a block diagram of a power source apparatus having a voltage control winding according to still another object of the present invention.
Figure 7:
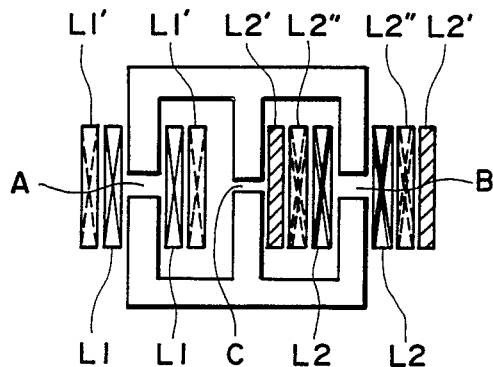
FIG. 7 is a sectional view of a converter transformer T1 shown in FIG. 6.

FIG. 7 shows an actual structure of windings of a transformer T1 in FIG. 6. The gap 3-1 shown in FIG. 6 is actually constituted by gaps of the A, B, and C portions. The gap of the C portion is smaller than that of each of the A and B portions. A voltage induced by the winding L2' during the OFF time of the switch S1 is decreased. The gap of the B portion is larger than that of the A portion.

Figure 8:
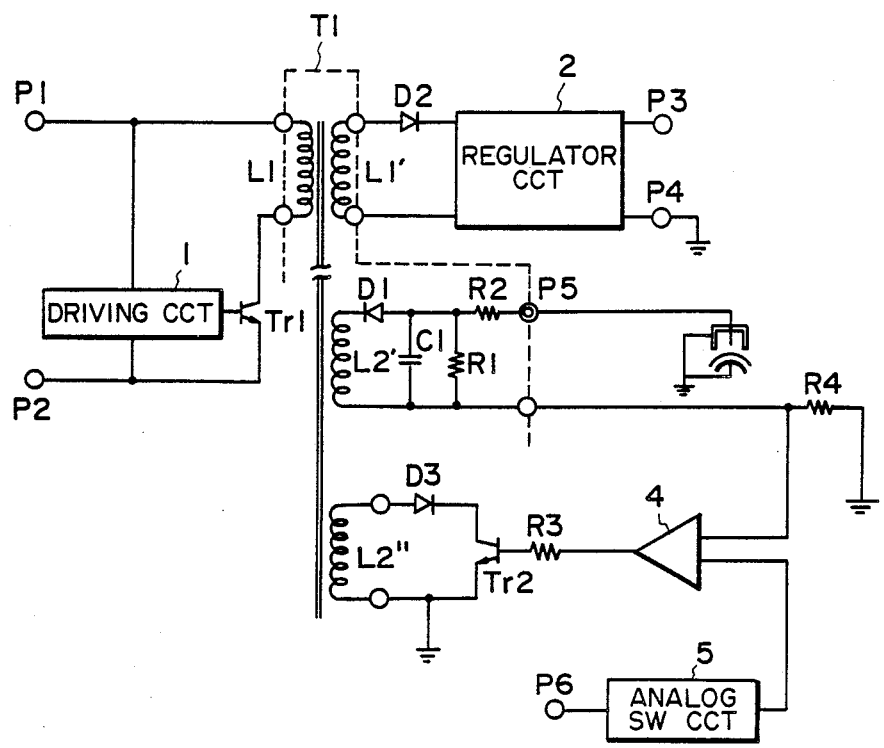
FIGS. 8 and 9 are block diagrams showing modifications of the power source apparatus obtained such that primary winding in FIG. 6 is constituted by only L1 according to still another embodiment of the present invention.

FIG. 8 shows a modification of FIG. 6 wherein the primary winding is constituted by only a primary winding L1, and a high voltage output is controlled by a high voltage control winding L2''.

In the modification of FIG. 8, a load current of the charger is detected by a resistor R4, and the detected current is compared with a reference value by an error amplifier 4. An output from the error amplifier 4 is supplied to the base of a transistor Tr2 to change the collector current of the transistor Tr2, i.e., a current through a high voltage control winding L2", thereby stabilizing the load current of the charger.

An analog switch circuit 5 switches the reference voltage such that the transistor Tr2 is turned on in response to the control input to a terminal P6 in the noncopy mode but a charging current flowing through the resistor R4 is set at a predetermined current in the copy mode.

Figure 9:
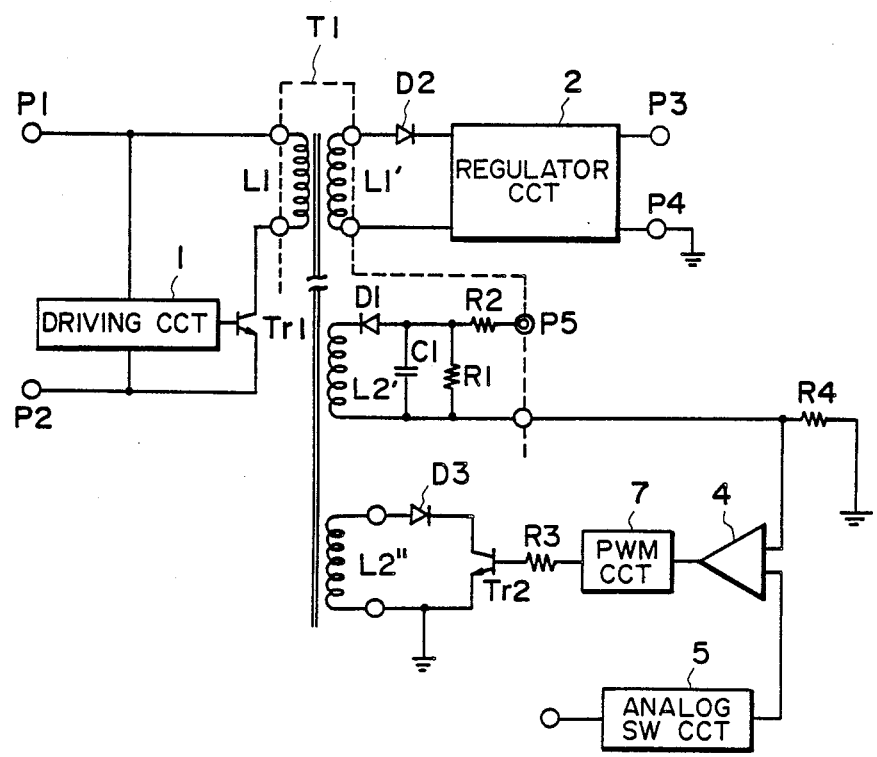

FIG. 9 shows a modification of the circuit in FIG. 8. In this modification, an output from the error amplifier 4 in FIG. 8 is supplied to a PWM circuit 7 to control switching of the transistor Tr2, thereby improving efficiency.

As is apparent from the above embodiment, low and high voltages can be applied from a single transformer, and a high voltage output timing can be controlled in response to the sequence signal.

In the modifications in FIGS. 8 and 9, the primary power supply need not be switched, and the overall circuit arrangement can be simplified. In addition, the high voltage output can be stabilized.

Still another embodiment of the present invention will be described wherein voltages are supplied from the above-mentioned transformer to the processes in an electrophotographic apparatus.

Figure 10:
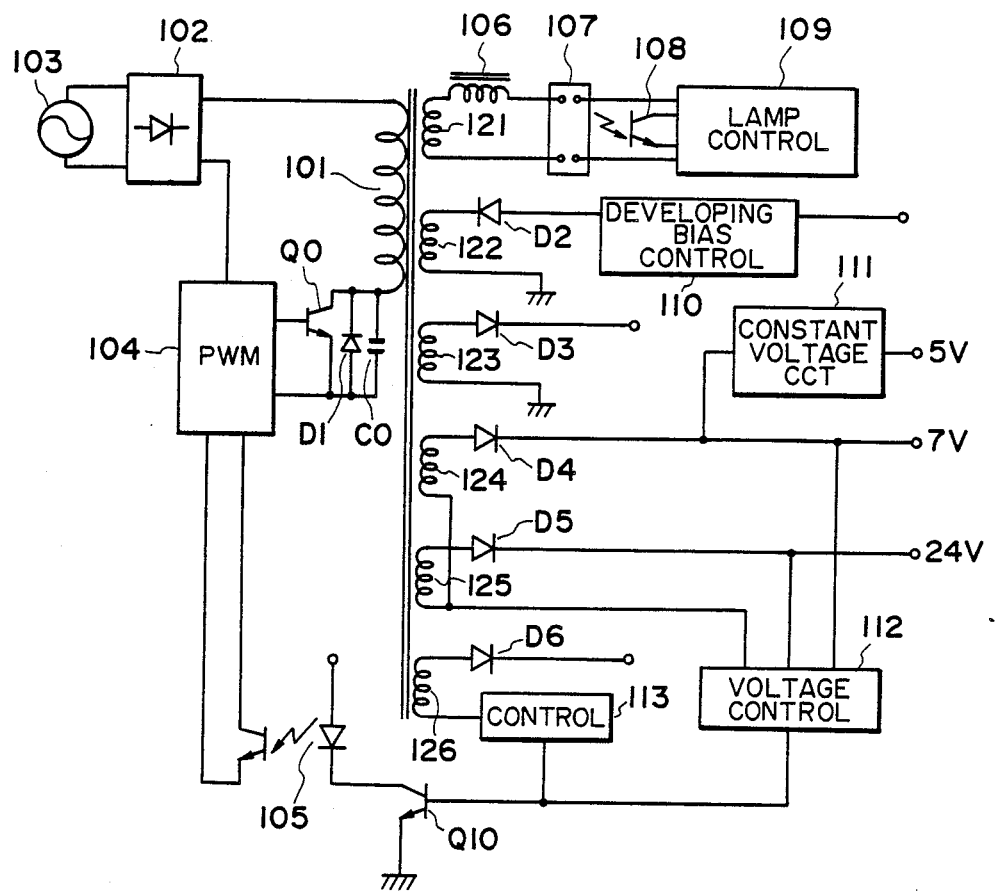
FIG. 10 is a circuit diagram of an image formation apparatus using an electrophotographic process according to still another embodiment of the present invention.

FIG. 10 shows an arrangement of a power source apparatus for an electrophotographic apparatus.

Referring to FIG. 10, the power source apparatus comprises a single converter transformer (to be referred to as a transformer hereinafter) T.

The arrangement of the primary winding of the transformer T is the same as that of the conventional power source transformer. A primary winding 101 is connected to a commercial power source 103 through a rectifying/smoothing circuit 102. A switching transistor Q0 driven by a PWM control circuit 104 is connected to the primary winding 101 through a damper diode D1 and a resonant capacitor C0. The PWM control circuit 104 controls a pulse width of a signal for driving the transistor Q0 in response to output signals from a voltage control circuit 112 and a control circuit 113 which are fed back from the voltage control circuit 112 and the control circuit 113 through a transistor Q10 and a photocoupler 105 in a perfect insulated state.

Secondary windings 121 to 126 are connected to the secondary side of a transformer T to obtain power source outputs respectively corresponding to the power reception sections excluding a back-up voltage during the power OFF state of the electrophotographic apparatus.

The secondary winding 121 serves to extract a drive output for an original exposure lamp 107 and is connected to the original exposure lamp 107 through a choke coil 106. The original exposure lamp 107 is connected to a lamp control 109 through a phototransistor 108. The lamp control 109 controls an amount of light from the lamp 107.

The secondary winding 122 serves to extract a development bias output and is connected to a developing unit (not shown) through a rectifying diode D2 and a developing bias control 110 for shaping the waveform.

The secondary winding 123 serves to extract a discharging bias high voltage output and is connected to a discharger (not shown) through a diode D3.

The secondary windings 124 and 125 serve to extract low voltage DC outputs of 7 V and 24 V through sequence control diodes D4 and D5, respectively. The DC output of 7 V is used to extract a DC output of 5 V through a constant voltage circuit 111. The DC output of 5 V is applied to a photoelectric copying machine control circuit (not shown). The voltages of 7 V and 24 V are controlled by a constant voltage control circuit 112. A detailed arrangement of the control circuit 112 will be described later.

The secondary winding 126 serves to extract a charger driving high voltage output and is connected to a charger (not shown) through a diode D6. The control circuit 113 is connected to the winding 126 to output an overcurrent detection signal to the PWM control circuit 104, thereby preventing an overcurrent.

The polarities of the secondary windings 122, 123, 125, and 126 and the polarities of a diode D2 and the diodes D3, D4, D5, and D6 are selected to cause a current (i.e., a flyback current) to flow during an OFF period (i.e., the OFF period of the transistor Q0) of a DC voltage intermittently applied to the primary winding 101.

The polarities of the diode D4 are selected for the winding 124 such that a current (i.e., a forward bias current) is supplied during an ON period (i.e., the ON period of the transistor Q0) of the DC voltage applied to the primary winding 101.

The current is not rectified for the winding 121, and a current is supplied thereto during the OFF and ON periods.

Control of the voltages 7 V and 24 V will be described in detail. This control is performed by the PWM control circuit 104 through the voltage control 112. In the standby state of the electrophotographic apparatus, constant voltage control for 7 V is performed, so that a voltage of 5 V as a power source voltage for the control circuit in the electrophotographic apparatus is assured. During preheating of the original exposure lamp 107, the voltage of 24 V is controlled to a voltage of 12 V, thereby causing the lamp 107 to perform preheating. During operation (copying) of the electrophotographic apparatus, constant voltage control for 24 V is performed, and the voltage of 24 V is applied to the respective operating sections.

The voltage control circuit 112 selects the 7- or 24-V line in accordance with the selected mode, i.e., the standby mode or the preheating mode. The voltage control circuit 112 divides a voltage according to predetermined voltage division ratios and compares the divided voltage with a predetermined reference voltage. The voltage control circuit 112 outputs to the PWM control circuit 104 a detection signal representing a result of comparison between the divided voltage and the reference voltage. The above control operation is performed on the basis of the detection signal.

Figure 11:
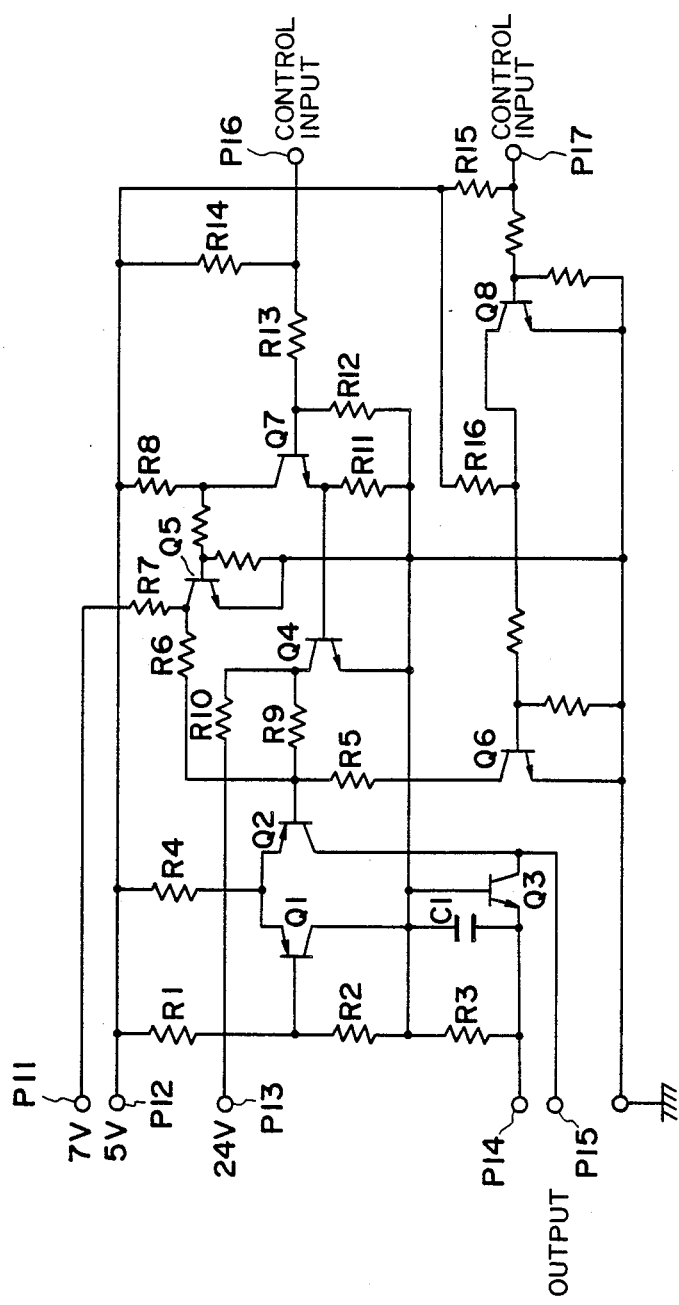
FIG. 11 is a circuit diagram showing a detailed arrangement of part of the apparatus in FIG. 10.

FIG. 11 shows a detailed arrangement of the voltage control circuit 112. Referring to FIG. 11, 7- and 24-V lines are respectively connected to terminals P11 and P13. A DC voltage of 5 V as a circuit drive power source is applied from the constant voltage circuit 111 to a terminal P12. A terminal P14 serves as a ground terminal of the windings 124 and 125. A terminal P15 serves as an output terminal of the circuit 112. Terminals P16 and P17 serve as control input terminals for receiving control signals from the control circuit in the electrophotographic apparatus.

Transistors Q1 and Q2 constitute a comparator. A predetermined reference voltage obtained by causing resistors R1 and R2 to divide a voltage of 5 V is applied to the base of the transistor Q1.

In the standby mode of the electrophotographic apparatus, the control signals input to the control input terminals P16 and P17 are set at high level. Transistors Q5 and Q6 are turned off, and transistors Q4, Q7, and Q8 are turned on. The voltage on the 7-V line is divided by resistors R7, R6, and R9, and a divided voltage is applied to the base of the transistor Q2. A voltage on the 24-V line is grounded through the transistor Q4 and is not applied to the base of the transistor Q2.

When a base voltage of the transistor Q2 is higher than the base reference voltage, the transistor Q2 is turned off. The detection signal fed back to the PWM control circuit 104 is disabled. The PWM control circuit 104 controls the switching pulse width to decrease the output voltage. However, if the base voltage of the transistor Q2 is lower than the reference voltage, the transistor Q2 is turned on. The detection signal is output, and the output voltage is increased. In this manner, 7-V constant voltage control is performed.

During the operation of the electrophotographic apparatus, the control signals input to the terminals P16 and P17 are set at low level. The transistors Q4, Q7, and Q8 are turned off, and the transistors Q5 and Q6 are turned on. The voltage on the 24-V line is divided by a resistor R10, the resistor R9, a resistor R5, and the resistor R6, and a divided voltage is applied to the case of the transistor Q2 and is compared as described above, thereby completing 24-V constant voltage control.

During preheating the original exposure lamp 107, the control signal input to the terminal P16 is set at low level, and the control signal input to the terminal P17 is set at high level. The transistors Q4, Q6, and Q7 are turned off, and the transistors Q5 and Q8 are turned on. A voltage on the 24-V line is divided by the resistors R10, R9, and R6 according to a voltage division ratio different from that described above. A divided voltage is applied to the base of the transistor Q2. Control is thus performed to reduce the voltage on the 24-V line into a voltage of 12 V.

When an overcurrent is supplied to the secondary windings 124 and 125, a voltage drop through a resistor R3 connected to the ground terminal P14 is increased, and a transistor Q3 is turned on. The detection signal is disabled, and the power is cut off accordingly.

The overall operation of the circuit shown in FIG. 10 will be described below.

An AC voltage from the commercial power source 103 is rectified and smoothed by the rectifying/smoothing circuit 102. The smoothed DC voltage is applied to the primary winding 101. At the same time, the transistor Q0 is driven and subjected to ON/OFF operation in response to the switching pulse generated by the PWM control circuit. The DC voltage is then intermittently ON/OFF, thereby obtaining outputs corresponding to the winding ratios of the secondary windings 121 to 126. The voltage is directly supplied to the winding 121, and voltages are supplied to other windings through the diodes D2 to D6.

The 7- or 24-V line is controlled by the PWM control circuit 104 through the voltage control circuit 112 in the preheating mode of the original exposure lamp 107, or the standby or operating mode of the electrophotographic apparatus.

Voltage resonance is performed by the primary winding 101 at a resonance frequency determined by a primary inductance of the primary winding 101, a secondary distributed capacitance, and a capacitance of the resonance capacitor C0. The OFF time of the intermittent operation of the DC voltage applied to the primary winding 101 can be given as a predetermined time such that the DC voltage is applied at a zero-crossing point of the resonance voltage in association with the resonance frequency.

Voltage control by the PWM control circuit 104 through the voltage control circuit 112 is performed by controlling the ON time (i.e., the ON time of the transistor Q0) of the DC voltage applied to the primary winding 101.

In order to reduce the total power consumption, in the standby mode of the electrophotographic apparatus, voltage control by controlling the ON time is preferably performed such that the high voltage output and the drive output for the original exposure lamp 7 are set to be about $\frac{1}{2}$ to about 1/6 the voltage required for operating the electrophotographic apparatus.

The power source apparatus according to this embodiment comprises only one converter transformer T, and therefore the cost and size of the apparatus can be reduced. The secondary windings 121 to 126 are classified into ones through which the flyback current is supplied, ones through which the forward current is supplied, and ones through which both the flyback and forward currents are supplied, thereby improving efficient utilization of power. The winding through which the forward current is supplied is not adversely influenced by current variations in the winding through which the flyback current is supplied, thereby obtaining stable outputs. Power can be effectively utilized by the voltage resonance and by fixing the ON time of the DC voltage associated with the resonance frequency.

Figure 12:
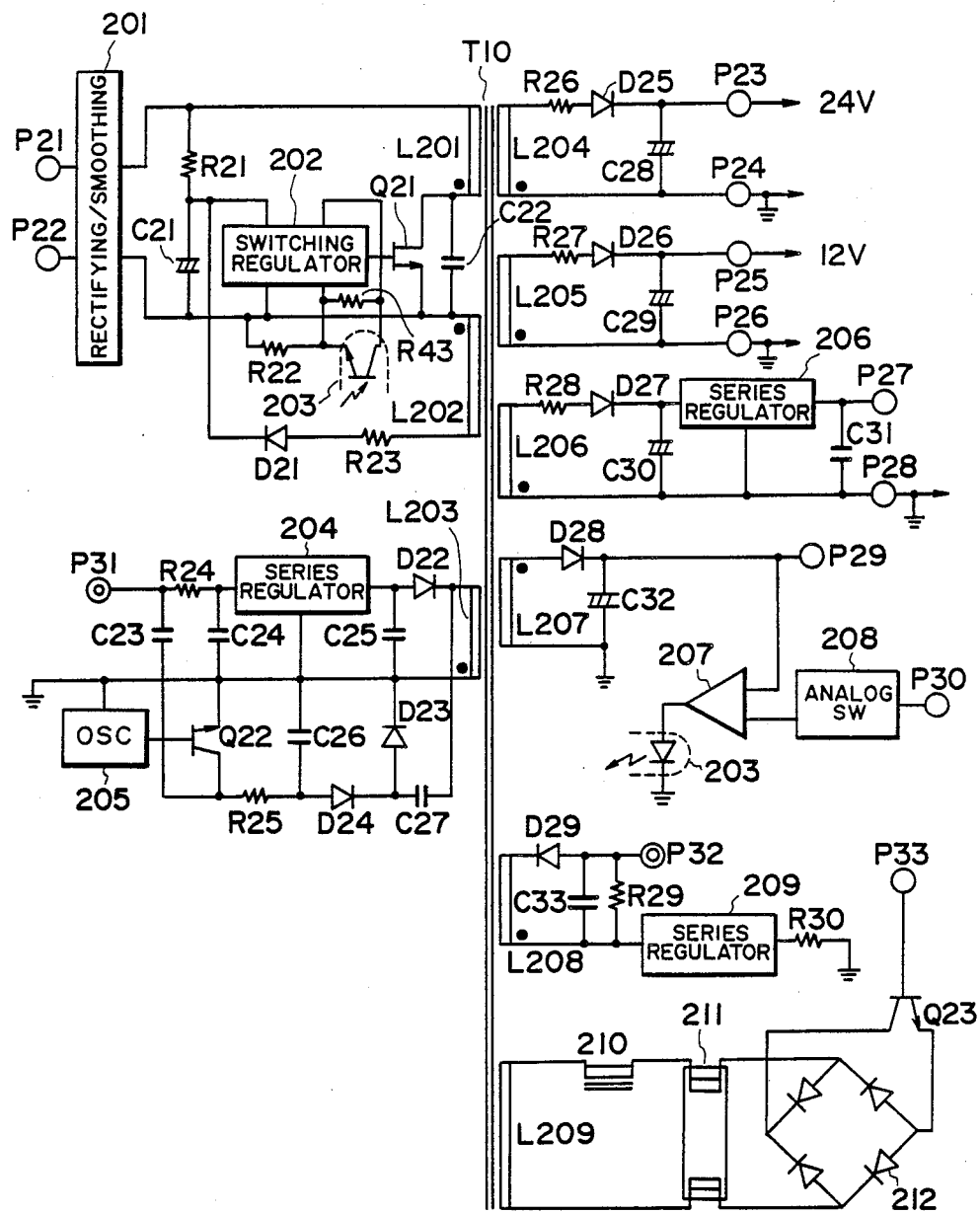
FIG. 12 is a circuit diagram of a power source apparatus for selectively outputting different voltages from one terminal according to still another embodiment of the present invention.

FIG. 12 is a circuit diagram of a power source apparatus according to still another embodiment of the present invention. In this embodiment, a plurality of high and low voltage secondary windings are arranged in a single converter transformer T10, and the respective windings supply corresponding powers to corresponding high and low voltage loads in the electrophotographic apparatus. A DC voltage rectified and smoothed by a rectifying/smoothing circuit 201 (including a diode and a capacitor) for processing an AC voltage applied across terminals P21 and P22 is input to a primary winding L201 in the transformer T10. The input voltage applied to the primary winding L201 is controlled by a transistor Q21. A resonance capacitor C22 is connected between the collector and emitter of the transistor Q21. As ON ratio of the transistor Q21 is controlled by a switching regulator 202. The switching regulator 202 receives power generated by a secondary winding L202. One end of the secondary winding L202 is connected to a common potential point of the primary winding L201. The other end of the secondary winding L202 is connected to a rectifying circuit comprising a resistor R23 and a diode D21. An output from the diode D21 is input to a connecting point between a resistor R21 and a capacitor C21 for dividing the voltage input to the primary winding L201. The switching regulator 202 is driven at the leading edge of the voltage appearing at the connecting point between the resistor R21 and the capacitor C21. When the output is stabilized, the switching regulator 202 is operated in response to the rectified output from the secondary winding L202.

The switching regulator 202 controls the base of a transistor Q1 in response to an output from a shunt regulator 207 (to be described later). The shunt regulator 207 is insulated from the switching regulator 202 by a photocoupler 203. The collector and emitter of the phototransistor of the photocoupler 203 are connected to the switching regulator 202. The emitter of this phototransistor is connected to a primary winding common potential point through a resistor R22.

The transformer T10 further includes secondary windings L203 to L209, winding ratios of which are determined by necessary voltages. The polarities of the secondary windings are set such that the start points of the windings are indicated by black dots, respectively.

The secondary winding L203 serves to supply a developing bias voltage obtained by superposing AC and DC voltages and to be supplied to the developing unit. The secondary winding L203 is connected to a circuit for generating a negative DC voltage and an AC high voltage. The negative terminal of the secondary winding L203 is positioned as indicated in FIG. 12 and a potential threat serves as a common potential. A circuit illustrated above the common potential is to generate a negative DC voltage. This circuit comprises a rectifying/smoothing circuit of a diode D22 and a capacitor C25, and a filter circuit of a series regulator 204, a resistor R24, and a capacitor C24. One end of the resistor R24 is connected to an output terminal P31. A high voltage AC signal generated by a circuit illustrated below the common potential line is coupled to the terminal P31 through a capacitor C23.

A voltage output from the secondary winding L203 is doubled and rectified by diodes D23 and D24 and capacitors C26 and C27. The rectified output is connected to the collector of a transistor Q22 through a resistor R25. The transistor Q22 is switched in response to an output from an oscillator 205. As a result, a high voltage AC output appears at the collector of the transistor Q22. This AC output is superposed on the DC voltage through the capacitor C23, and the superposed output is applied to the developing unit. In the process for generating the developing bias voltage, the DC component is about −600 V and the AC voltage geneneraged by the transistor Q22 is about 1.2 kV. A switching frequency of the transistor Q22 is about 1,800 Hz, and an oscillation waveform is a rectangular waveform or any other waveform.

The secondary windings L204 and L205 serve to supply low voltages of 24 V and 12 V to the loads. The secondary winding L204 is connected to a rectifying/smoothing circuit of a resistor R26, a diode D25, and a capacitor C28. Similarly, the secondary winding L205 is connected to a rectifying/smoothing circuit of a resistor R27, a diode D26, and a capacitor C29. The rectified/smoothed DC voltages are supplied to the corresponding loads through terminals P23 and P24 and terminals P25 and P26. The 24-V loads are a fixing-/heater control, an operation unit, and a cooling fan motor, all of which must always be energized upon operation of the power switch. 12-V loads can be indicator lamps or the like.

The secondary winding L206 is connected to a rectifying/smoothing circuit of a resistor R28, a diode D27, and a capacitor C30. The secondary winding L206 is further connected to a stabilizing series regulator 206. A stabilized output voltage is set at 5 V. An output voltage of 5 V is supplied to a sequence controller of a microprocessor, a memory, and the like through terminals P27 and P28.

The secondary windings L204 to L206 are controlled in the forward mode such that the diodes D 25 to D27 are turned on when the primary switching transistor Q21 is turned on. The output voltages at the secondary windings L204 to L206 are proportional to the rectified voltages as the line inputs applied across the primary windings and are not associated with the ON ratio of the transistor Q21.

Since the secondary winding L207 controls the image formation process, it generates a DC voltage of 5 V in the standby mode and a DC voltage of 24 V during image formation. The secondary winding L207 is connected to a rectifying/smoothing circuit of a diode D28 and a capacitor C32. An output voltage from a terminal P29 is controlled by the shunt regulator 207. The shunt regulator 207 is controlled through an analog switch 208 in response to a control signal input from a terminal P30. The voltage at the output terminal P29 is set at 5 V in the standby mode and 24 V in the image formation mode. The operation state of the shunt regulator 207 is transmitted to the switching regulator 202 on the primary winding of the transformer through the photocoupler 203.

The secondary winding L208 serves to supply a charging current to a transfer charger and other chargers and is connected to a rectifying/smoothing circuit of a diode D29 and a capacitor C33. The secondary winding is connected to a detection resistor R30 for a discharge resistor R29. An output voltage appears at a terminal P32. A charging current is detected by the detection resistor R30. A series regulator 209 controls one end of the secondary winding L208 on the basis of the detection signal, thereby controlling a desired charging current.

The secondary winding L209 serves to turn on a fluorescent lamp 211 for illuminating an original and supplies power to the fluorescent lamp 211 through a ballast 210. The preheating or operation mode is selected by controlling one end of a filament of the fluorescent lamp 211 by a diode bridge 212 and a transistor Q23. The transistor Q23 is controlled in response to a control signal input from a terminal P33.

The polarities of the secondary windings L203, L207, and L208 are selected such that the rectifying diodes connected thereto are turned on when the primary winding switching transistor Q21 is turned off (i.e., the flyback mode). In particular, the output state of the secondary winding L207 is fed back to the primary side through the photocoupler 203. The excitation state of the transformer is controlled in accordance with the output state of the photocoupler 203.

In the sequence control low voltage power source, the rectifying diodes are turned on when the switching transistor on the primary side of the transistor is turned on, thereby charging the smoothing capacitors. The low voltage power source is therefore operated in the forward mode for supplying power to the loads. In the high voltage secondary winding, the rectifying diodes are turned on when the switching transistor is turned off, thereby charging the smoothing capacitors and hence supplying power to the loads.

Assume that an AC voltage is input to the terminals P21 and P22, that the switching transistor Q21 is turned on, and that an output is generated by each secondary winding. When the switching transistor Q21 is turned on, the rectified/smoothed output voltage is applied to the primary winding, and a voltage obtained by boosting or decreasing the primary voltage according to winding ratios is generated by the corresponding secondary winding. During the ON period of the switching transistor Q21, the secondary rectified output depends on the state of the load. Even if the ON ratio of the switching transistor is greatly changed, the secondary rectified output is not greatly influenced. More specifically, the outputs of the forward windings L204 to L206 are not greatly changed even if the load states of the secondary windings L207, L208, and L203 for energizing the voltage-drop loads are greatly changed. Therefore, a high voltage output can be controlled independently of a low voltage load.

An image formation mechanism is set in the standby mode as soon as the power switch is turned on. The sequence control circuit is started with a power source voltage appearing from the terminals P27 and P28.

In the standby state, loads (e.g., a sequence control motor, a clutch, and a solenoid) having high power consumption as well as charging, exposure, and developing loads are deenergized. In this state, a high voltage power is not supplied from the series regulator 204, the oscillator 205 and the series regulator 209 to high voltage loads such as a developing unit and a charger.

The shunt regulator 207 is operated such that an output voltage of 5 V is output from the terminal P29 in the standby mode. This mode is fed back to the switching regulator 202 through the photocoupler 203.

Since the high voltage loads on the secondary winding side are deenergized, the switching regulator 202 controls to decrease the ON ratio of the switching transistor Q21. For this reason, a flyback voltage generated in proportion to the ON ratio has a low value. As a result, since the high output voltage is output from the flyback windings, its level is decreased to 20 to 30% or less that during image formation. This voltage level does not influence the operation of the photosensitive drum at all. With such a low output voltage, a load current is rarely supplied to the charger and the developing unit. Therefore, the image formation process is not adversely affected.

In the image formation mode, the shunt regulator 207 outputs the voltage of 24 V from the terminal P29 through the analog switch 208. The voltage of 24 V represents that the electrophotographic apparatus is set in the operating state. The operating state of the shunt regulator 207 is fed back to the switching regulator 202 through the photocoupler 203. As a result, the ON ratio of the switching transistor Q21 is increased. This is because that the image formation processes such as rotation of the photosensitive drum and movement of the optical system are initiated and the load current supplied to the transformer is increased.

The switching regulator 202 controls the ON ratio such that the flyback voltage applied to the transformer T1 is kept constant during the image formation period. For this reason, predetermined voltage drops occur in the windings L203, L207, and L208, all of which serve as the flyback windings. By using the output voltages from these flyback windings, the developing unit and the charger can be energized. In this state, the ON ratio is controlled such that the flyback voltage to the transformer T10 is controlled to be constant. By this control, the low load voltages connected to the secondary windings L204 to L206 serving as the forward windings are rarely adversely affected.

As described above, with the arrangement shown in FIG. 12, various voltages including high and low voltages can be generated using a single converter transformer. In addition, the loads connected to the high and low voltage sources can be independently controlled without crosstalks.

Figure 13:
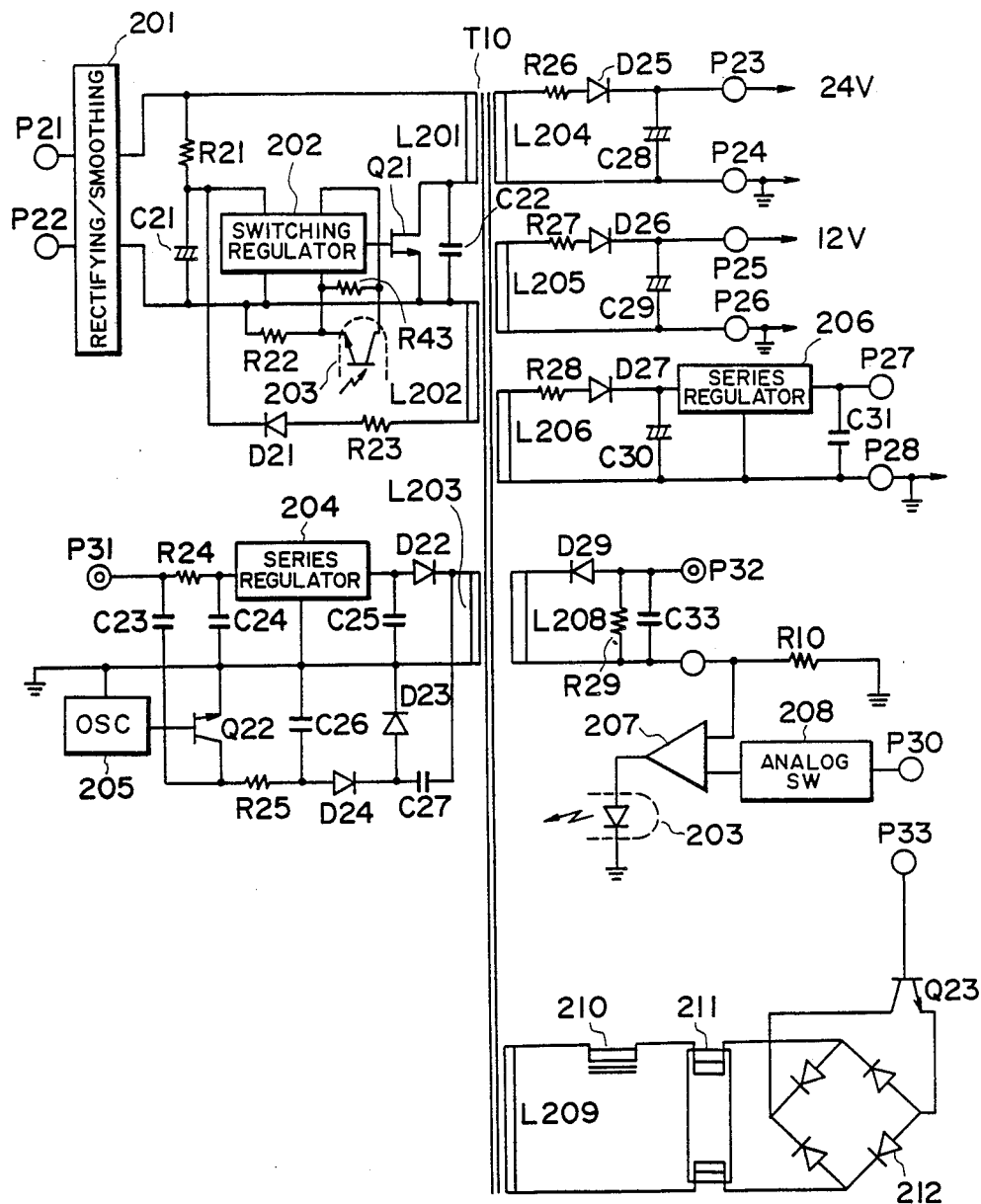
FIGS. 13 and 14 are circuit diagrams showing modifications of the apparatus shown in FIG. 12.

In the arrangement of FIG. 12, the winding L207 is arranged to apply a voltage to the shunt regulator. However, as shown in FIG. 13, the shunt regulator may be connected to the winding L208 for applying a voltage to the charger. Referring to FIG. 13, the shunt regulator 207 is connected to one end of the resistor R30 for dividing the output from the winding L208. The shunt regulator 207 is also connected to the photocoupler 203 and the analog switch 208 in the same manner as in FIG. 13. Even with the arrangement of FIG. 13, the charging current is switched in the image formation and standby modes. A charging current is not supplied at a voltage of 4 kV or less due to the voltage vs. current characteristics (load characteristics) of the charger. Therefore, output control at a voltage of 4 kV or less is impossible. For this reason, in order to assure a predetermined output in the standby mode, a resistor R43 is connected across the output phototransistor in the photocoupler 203.

In the arrangement of FIG. 13, the number of windings can be reduced by one, and therefore the transformer T10 can be compact and lightweight.

Figure 14:
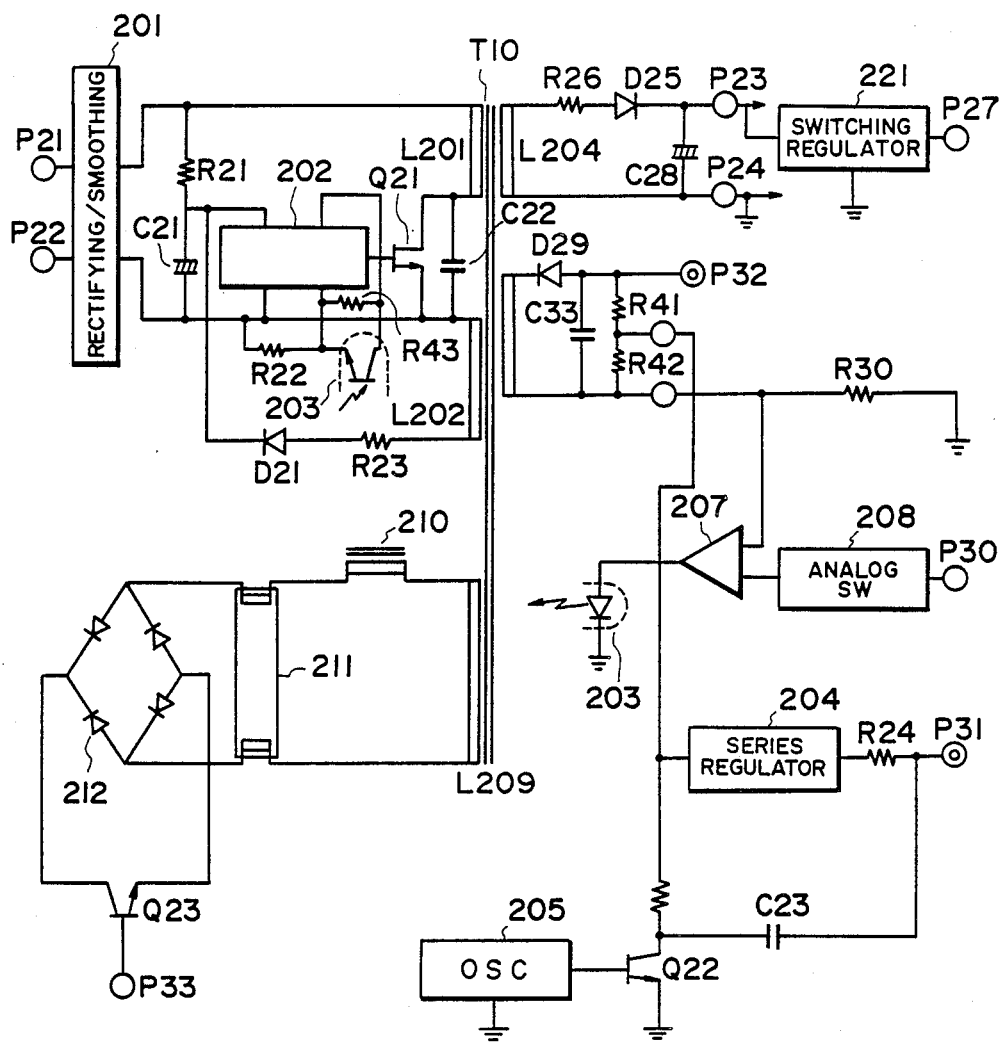

As shown in FIG. 14, in addition to the winding L207, other windings L203, L205, and L206 shown in FIG. 12 may be omitted.

Referring to FIG. 14, the peripheral circuit of the shunt regulator 207 is connected to the winding L208, and a voltage obtained by dividing an input voltage by resistors R41 and R42 is applied to a switching regulator for generating a developing bias voltage and the transistor Q22 for generating a developing bias AC component. The base of the transistor Q22 is driven by the oscillator 205 in the same manner as in FIGS. 12 and 13.

A 5- and 12-V low voltage outputs can be generated such that a switching regulator 221 converts the rectified output from the winding L204.

Figure 15:
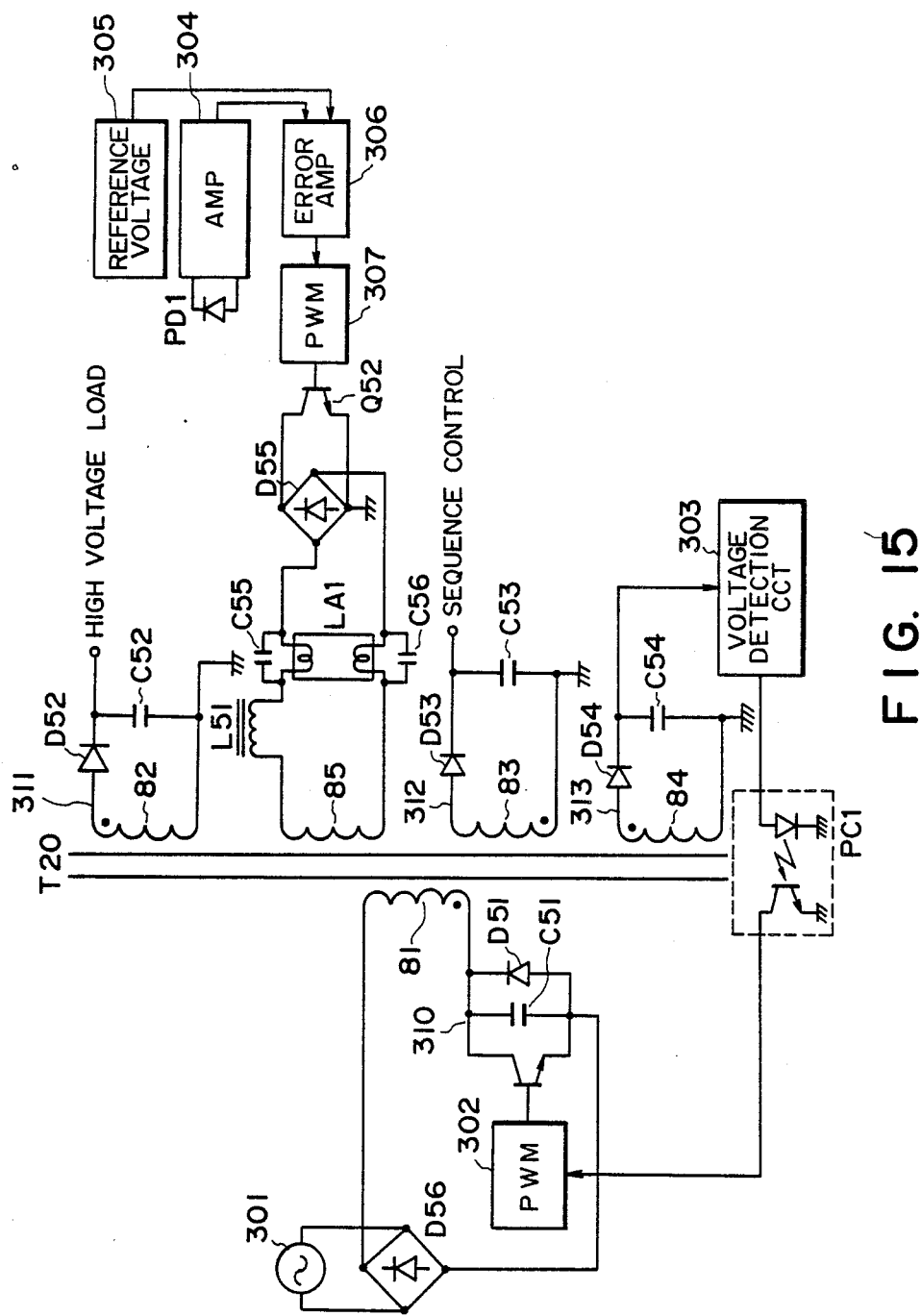
FIG. 15 is a circuit diagram of an arrangement in which an LC load is connected between a lamp and a secondary winding according to still another embodiment of the present invention.

FIG. 15 is a circuit diagram of a power source apparatus according to still another embodiment of the present invention. In this embodiment, a low voltage DC output is generated in the ON period of the primary side of the transformer and a high voltage DC output is generated during the OFF time of the primary side. In addition, an AC output is generated during both the ON and OFF periods. This AC output is supplied to the lamp, and an AC load is connected between the lamp and a secondary winding of the AC output. The arrangement of this power source apparatus will be described in more detail below.

Referring to FIG. 15, an output from a commercial AC power source or a power source 301 comprising other transformer circuits is rectified by a bridge diode D56. The rectified output is supplied to a primary winding 81 in a converter transformer T20. The DC voltage supplied from the bridge diode D56 to the primary winding 81 is interrupted by a transistor Q51. A capacitor C51 cooperated with the primary winding 81 to obtain a predetermined resonance frequency and a damper diode D51 are connected between the collector and emitter of the transistor Q51. The base of the transistor Q51 is controlled by a PWM circuit 302 comprising an oscillator and a pulse width modulator. The PWM circuit 302 controls an ON ratio (dury ratio) of the transistor Q51 in accordance with the secondary output voltage (to be described later) and stabilizes the secondary output voltage.

Four secondary windings 82 to 85 are arranged on the secondary side of the converter transformer T20.

The secondary winding 82 serves as a high voltage winding for supplying a bias voltage to a charger or a developing unit and is connected to a rectifying/smoothing circuit of a diode D52 and a capacitor C52. The polarities of the windings of the converter transformer T20 and the polarities of the diode D52 are properly selected to set the switching mode of the winding to the flyback mode. More specifically, a voltage generated bY the secondary winding 82 is applied to the load through the diode D52 for a period in which the secondary winding 81 is deenergized.

The secondary winding 83 is connected to a rectifying/smoothing circuit of a diode D53 and a capacitor C53. A converted DC output voltage is supplied as a power source voltage to a sequence controller such as a microcomputer. The polarities of the secondary winding 83 are opposite to those of the secondary winding 82. The switching mode of the secondary winding 83 is a so-called forward mode in which the switching transistor of the primary side and the rectifying diode of the secondary side are simultaneously turned on.

The secondary winding 84 serves as a voltage detection winding and is connected to a rectifying/smoothing circuit of a diode D54 and a capacitor C54. The switching mode of the secondary winding 84 is the flyback mode in the same manner as in the secondary winding 82. A rectified output is input to a voltage detection circuit 303 comprising a voltage divider and the like. The voltage is then fed back to the PWM circuit 302 of the primary side through a photocoupler PC1. Therefore, the PWM circuit 302 controls the duty ratio of the transistor Q51 such that the output voltage detected by the voltage detection circuit is set constant.

The secondary winding 85 serves to supply a voltage to a fluorescent lamp LA1 for illuminating an original. One end of the secondary winding 85 is connected to one end of one filament of the fluorescent lamp LA1 through an inductor L51. The other end of the secondary winding 85 is connected to one end of the other filament of the fluorescent lamp LA1. Both ends of the filaments at the both ends are connected to AC bypass capacitors C55 and C56.

The other terminal of each filament of the fluorescent lamp LA1 on the side opposite to connections for the secondary winding is connected to a corresponding one of two terminals of a bridge diode D55. The remaining two terminals of the bridge diode D55 are connected to the collector and emitter of a transistor Q52. The emitter of the transistor Q52 is grounded. The base of the transistor Q52 is connected to a PWM circuit 307 having the same arrangement as that of the PWM circuit 302. The PWM circuit 307 controls emission of the fluorescent lamp LA1 such that an amount of original illumination light detected by the photodiode PD1 is kept constant.

An output from a photodiode PD1 is amplified to a predetermined level by an amplifier 304. The amplified output is input to one input terminal of an error amplifier 306 comprising an operational amplifier. A reference voltage 305 generated by using a Zener diode is connected to the other input of the error amplifier 306. Therefore, the error amplifier 306 applies to the PWM circuit 307 a voltage corresponding to a difference between the reference voltage 305 and an output from the amplifier 304. The PWM circuit 307 changes the ON ratio of the transistor Q52 to maintain the amount of light from the fluorescent lamp LA1 constant.

The operation of the above arrangement will be described below.

An AC voltage is applied from the AC power source 301 in FIG. 15 to the bridge diode D56 and power source voltages are applied to the circuit blocks, an DC voltage rectified by the bridge diode D56 is applied to the primary winding 81 of the converter transformer T20 and both terminals of the series circuit of the primary winding and the transistor Q51. The transistor Q51 is switched in response to a pulse output from the PWM circuit 302. As a result, an AC signal is input to the primary side of the converter transformer T20.

For this reason, AC voltages corresponding to the winding ratios of the secondary windings 82 to 85 of the converter transformer T20 are generated and are applied to the loads directly or through corresponding rectifying circuits.

Figure 16:
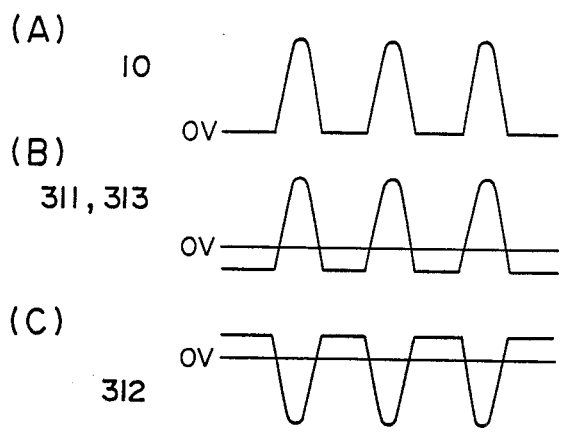

FIGS. 16(A) to 16(C) show voltage waveforms at connecting points 311 to 313 in FIG. 15.

FIG. 16(A) shows a collector current waveform of the transistor Q51. When the transistor Q51 is turned on, a collector voltage is set at 0 V. However, when the transistor Q51 is turned off, resonance occurs by a composite capacitance as a sum of an internal capacitance viewed from the primary winding 81 of the converter transformer T20 and the capacitance of the capacitor C51 and by an inductance of the primary winding 81 of the converter transformer T20, thereby obtaining a flyback waveform.

FIG. 16(B) shows an output waveform of a flyback winding, i.e., the connecting points 311 and 313. Power is supplied in the flyback mode wherein the diodes D52 and D53 are turned on while the transistor Q51 on the primary side is turned off. A voltage at the connecting points 311 and 313 has a value depending on the peak voltage of the flyback voltage waveform of the primary side.

FIG. 16(C) shows an output voltage of the sequence control forward mode winding, i.e., a voltage at the connecting point 312. In these windings, the forward and flyback windings are reversed and the polarities of the windings are also reversed. The diode D53 is turned on when the switching transistor of the primary side is turned on and the output voltage of the secondary side exceeds 5 V. In other words, forward mode power supply is performed. In this case, the output voltage depends on the voltage waveform of the ON period of the transistor Q51.

The voltage detection circuit 303 and the PWM circuit 302 in feed-back output control will be described with reference to FIGS. 17(A) to 17(C). It should be noted that the power supply mode of the winding subjected to voltage detection is the flyback mode.

Figure 17:
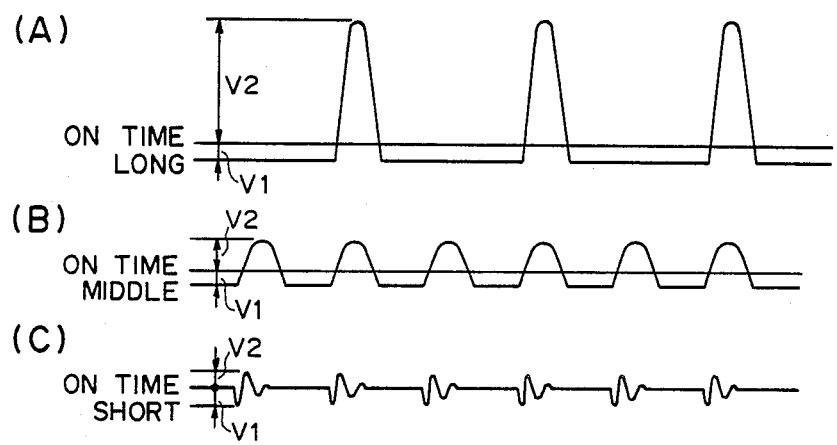

FIG. 17(A) shows changes in flyback and forward voltages generated by the converter transformer T20. A voltage V1 represents the forward voltage, and a voltage V2 represents the flyback voltage. The forward voltage depends on a DC voltage generated by the bridge diode D56. The flyback voltage V2 is proportional to energy accumulated for the ON period of the primary side of the converter transformer T20, i.e., until the primary side of the converter transformer T20 is cut off next. When the ON time of the transistor Q51 is gradually shortened by the PWM circuit 302, the forward voltage V1 rarely changed, as indicated in FIGS. 17(B) and 17(C). However, the flyback voltage V2 is decreased in proportion to the ON time. However, when the ON time of the primary side is decreased to a level below a predetermined level, the forward voltage is also decreased in proportion to that. This state is shown in FIG. 18.

Figure 18:
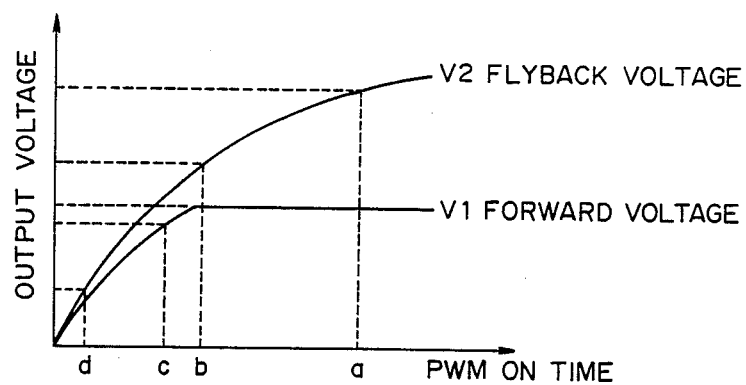
FIG. 18 is a graph showing changes in output voltage as a function of ON time of a primary winding of a transformer in the circuit shown in FIG. 15.

The ON time of the primary side of the converter transformer T20 is plotted along the abscissa in FIG. 18, and the output voltage is plotted along the ordinate. Referring to FIG. 18, up to time b, both the flyback and forward voltages are increased in proportion to the ON time of the primary side. However, when the ON time is longer than a period indicated by time b, the forward voltage is controlled to be constant. This voltage is proportional to the voltage applied to the primary side, as described above.

Control of power source outputs will be described below. When the main power switch of an image formation apparatus is turned on to connect the AC power source 301 to the bridge diode D56, the phototransistor in the photocoupler PC1 is not turned on in this initial period. The PWM circuit 302 controls the transistor Q51 to increase the voltage up to time d in FIG. 18. In other words, the ON time is gradually increased. When the ON time is longer than a period indicated by time d in FIG. 18, a voltage output from the secondary winding 84 and detected by the voltage detection circuit 303 has a value enough to turn on the photodiode in the photocoupler PC1. An output value is then fed back to the PWM circuit 302.

The PWM circuit 302 is operated to prolong the ON time such that the output voltage is increased to a level at time c or d. This control need not be performed by using the flyback voltage from the secondary winding 84 (FIG. 15) but can be performed by the forward voltage from the secondary winding 83. When the voltage is increased to a level at time d or c in FIG. 18, the sequence controller connected to the secondary winding 83 is started on the basis of a voltage detection signal output from the voltage detection circuit or the like. In this case, levels of AC output voltages generated by the secondary windings 82 and 85 are kept low. Only the sequence control voltage using the forward voltage is controlled to be constant. This state is called a standby state of the apparatus.

The sequence controller initializes components in the apparatus by key inputs from an operation unit or the like (not shown). The sequence controller supplies a signal to the voltage detection circuit 303 and controls the flyback voltage such that a voltage required for preheating the fluorescent lamp LA1 and a voltage required for turning on the fluorescent lamp LA1 are generated. In this case, the reference value or the like of the voltage detection circuit 303 is controlled to cause the PWM circuit 302 to prolong the ON time up to a period indicated by time a.

The control states of the fluorescent lamp LA1 are classified into preheating and ON or operating states. In the preheating state, the transistor Q52 is turned on and a current is supplied to the filaments of the fluorescent lamp LA1. However, in the ON state, the transistor Q52 is turned off, and a tube current is supplied across the filaments at both ends of the fluorescent lamp LA1.

In the preheating state, a current supplied through the inductor L51 is supplied to the collector-emitter path of the transistor Q52 through the filaments of both ends of the fluorescent lamp LA1, the capacitors C55 and C56, and the bridge diode D55. When the transistor Q52 is turned on, a current flowing through the secondary winding 85 is supplied through the inductor L51 to each filament, but not between the filaments. Therefore, the fluorescent lamp LA1 is not turned on and is controlled in the preheating state.

When the transistor Q52 is turned off, the bridge diode D55 is turned off. An output current from the secondary winding 85 is supplied as a tube current from one filament to the other filament of the fluorescent lamp LA1 through the inductor L51.

In the standby state set as soon as the power switch is turned on, the fluorescent lamp LA1 is controlled in the OFF state. In this case, the transistor Q52 is turned on. In the standby state, an output from the secondary winding 85 is low. Even if the transistor Q52 is turned on, the preheating current can be kept small. Even after the transistor Q52 is turned off after it is kept on for a predetermined period of time, the lamp LA1 is not turned on because an output level of the secondary winding 85 is kept low.

When a copy instruction is input from the operation unit, the PWM circuit 2 prolongs the ON time of the transistor Q51. The output from the secondary winding 85 is increased until its voltage is increased to allow preheating, thereby preheating the fluorescent lamp LA1. In this case, the transistor Q52 is turned on.

In order to turn on the fluorescent lamp LA1, the transistor Q52 is turned on. Since a tube current is not supplied through the fluorescent lamp LA1 as soon as the fluorescent lamp LA1 is turned on, a voltage drop across the inductor L51 does not occur. A high voltage is applied as a start voltage across the filaments at both ends of the fluorescent lamp LA1, thereby turning on the fluorescent lamp LA1. When the fluorescent lamp LA1 is turned on, the tube current is supplied from one filament to the other filament, and a voltage across the inductor L51 drops. Therefore, the voltage applied to the filament tube of the fluorescent lamp LA1 can be stabilized.

When the preheating state of the fluorescent lamp LA1 is changed to the ON state, the load impedance viewed from the secondary winding 85 is changed from a composite impedance of impedances of the inductor L51, the capacitors C55 and C56, and the filaments of the fluorescent lamp LA1 to a composite impedance of an impedance of the inductor L51 and an impedance across the fluorescent lamp LA1 through which the tube current is supplied. When the preheating state is changed into the ON state, the change in load impedance can be minimized since the inductor L51 is inserted in series with the fluorescent lamp LA1. Therefore, the change in impedance viewed from the primary side of the converter transformer T20 is considerably small, thereby minimizing the change in flyback waveform. As a result, the ON state of the fluorescent lamp LA1 can be stabilized.

Control of an amount of light emitted from the fluorescent lamp LA1 will be described below. An amount of light from the fluorescent lamp LA1 is detected by the photodiode PD1. A detected value is amplified by the amplifier 304, and an amplified signal is input to the error amplifier 306. The error amplifier 306 calculates a difference between the amplified signal and a reference voltage. The PWM circuit 307 controls the ON time of the transistor Q52 on the basis of the difference signal. During the ON period of the transistor Q52, the voltage across the fluorescent lamp LA1 is decreased, and the fluorescent lamp LA1 is turned off during the ON time of the transistor Q52. When the reference voltage 305 is set to obtain a predetermined amount of light, the above feedback loop can control the amount of light from the fluorescent lamp LA1 constant. In addition, by properly controlling the reference voltage 305, the amount of light emitted from the fluorescent lamp LA1 can be set at a predetermined level.

By controlling the fluorescent lamp LA1 as described above, the forward voltage is applied to the sequence control circuit. Therefore, a substantially constant stabilized power source voltage can be applied to the sequence control circuit. Even if the flyback voltage is increased to apply a predetermined voltage to the load such as a charger, a sequence power source voltage derived from the forward voltage can be controlled to be substantially constant.

In the image formation apparatus of an electrophotographic system, power source voltages can be applied from a common converter transformer to high and low voltage loads. Therefore, the number of transformers can be reduced, and the volume and weight of the power source apparatus can be greatly reduced. At the same time, the circuits having poor efficiency, such as a series regulator and a chopper circuit, need not be used for output control, power efficiency cannot be degraded. Furthermore, the ON time of the fluorescent lamp LA1 can be controlled by using the common converter transformer, the number of power source elements can be reduced as compared with the conventional power source apparatus. Furthermore, in the above embodiment, the impedance is connected in series with the fluorescent lamp, and the change in impedance can be kept substantially constant in both ON and preheating states. The state of voltage resonance when viewed from the primary side of the converter transformer can be kept constant regardless of the operation mode of the fluorescent lamp. The fluorescent lamp can be stably turned on in the flyback mode. At the same time, influences of other flyback loads can be reduced.

In the above embodiment, the AC load inserted in series with the fluorescent lamp is constituted by the inductor. However, a capacitor or the like may be used in place of the inductor.

Figure 19:
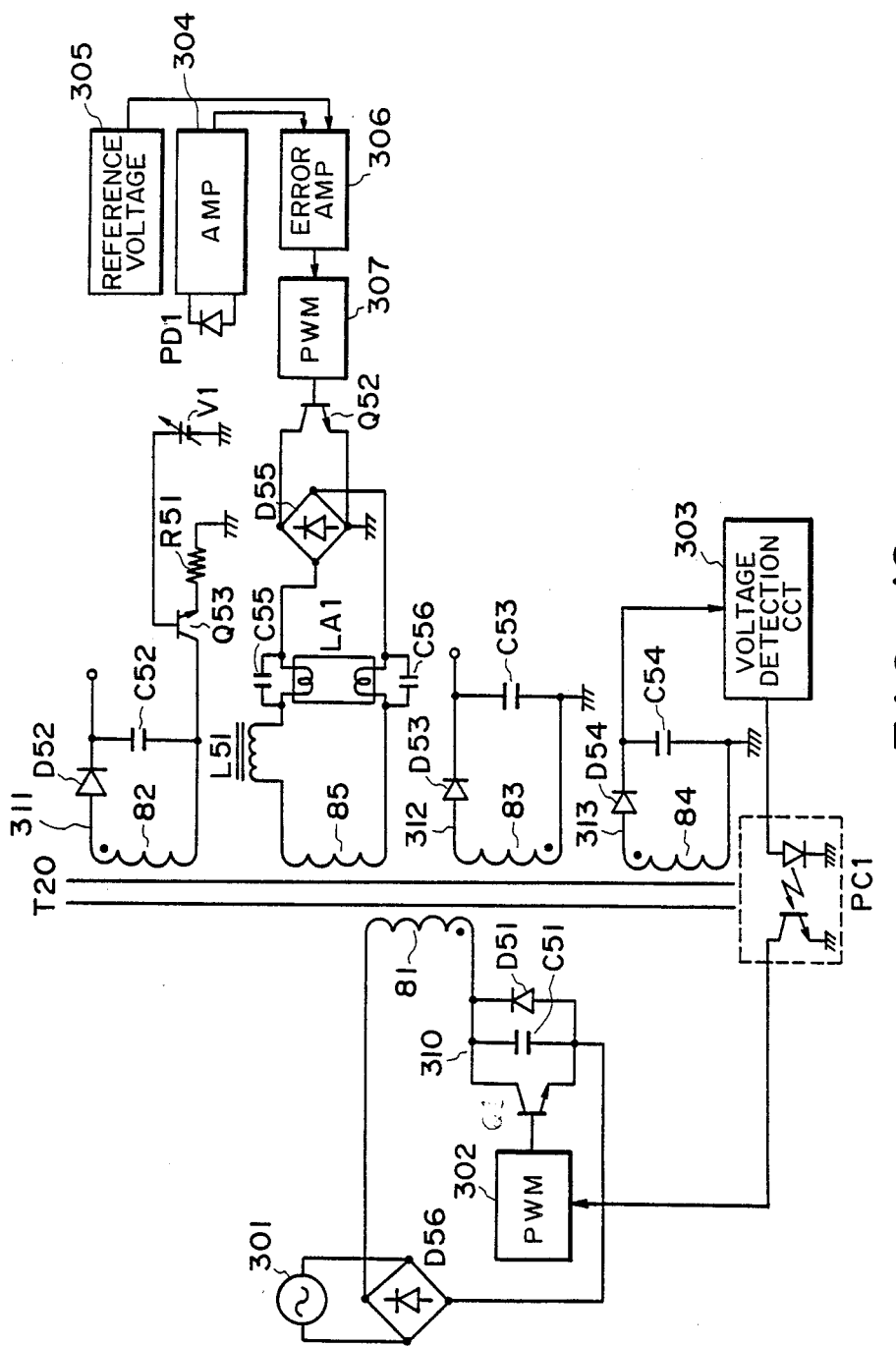
FIG. 19 is a circuit diagram of a power source apparatus according to still another embodiment of the present invention.
Figure 20:
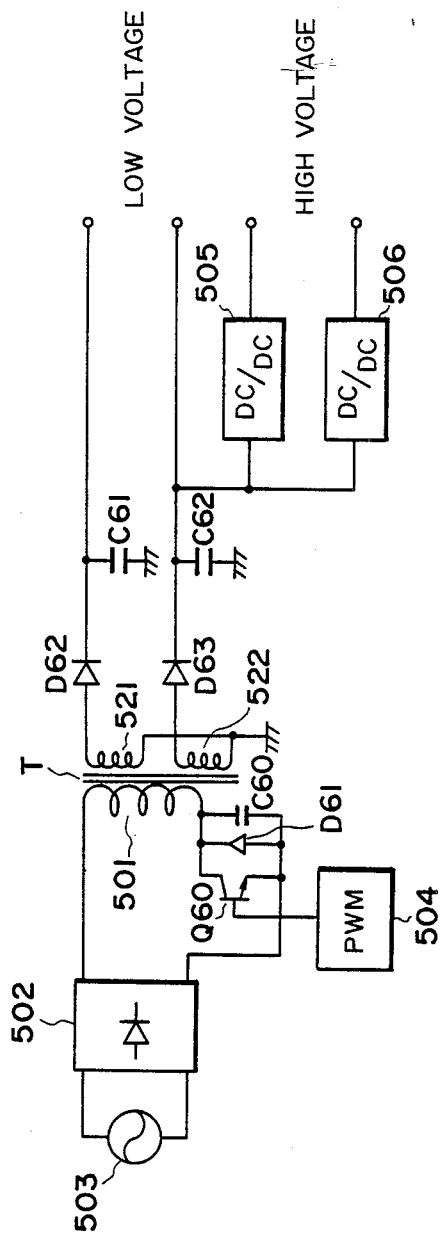
FIG. 20 is a circuit diagram of a conventional power source apparatus.

FIG. 19 shows a power source apparatus according to still another embodiment of the present invention, in which a circuit for controlling a high voltage output is added to the circuit in FIG. 15. The same reference numerals as in FIG. 15 denote the same parts in FIG. 19.

A series circuit of a collector-emitter path of an output control transistor Q53 and a resistor R51 is inserted between common and ground terminals of a secondary winding 82. A voltage V1 applied to the base of the transistor Q53 is controlled by a sequence control circuit to control a high voltage output.

In order to protect the transistor Q53 from an overvoltage, a constant voltage such as a varistor may be connected in the collector-emitter path of the transistor Q53. A bleeder resistor may be connected between the output terminal and ground.

In the standby state, by decreasing the control voltage V1, the transistor Q53 is turned off to cut off the high voltage output or reduce it to a considerably low level. The lamp can be turned off, or the high voltage output can be cut off or reduced in the preheating state.

It should be noted that other operations in FIG. 19 are the same as those in FIG. 15, and a detailed description thereof will be omitted.

In the above embodiment, the present invention is applied to the image formation apparatus using the electrophotographic process. However, the present invention is not limited to this, but can be applied to any apparatus for extracting a plurality of voltage outputs from a single transformer.

We claim:

1. A lower source apparatus comprising:
   a transformer having a first and second paired winding portions of primary and secondary windings wound around a plurality of cores, wherein said plurality of cores comprise first, second and third core portions, and said plurality of cores being divided by a gap, and wherein said gap comprises a first gap portion in said first core portion on which said first paired winding portion is wound, a second gap portion in said second core portion on which said second paired winding portion is wound, and a third gap portion in said third core portion, said third gap portion being smaller than said first gap porion and said second gap portion;
   driving means, connected to said primary winding of said paired winding portion, for switching energization of said primary winding of said transformer to cause said secondary winding to generate a voltage; and
   selecting means for selectively driving one of said plurality of paired winding portions.

2. An apparatus according to claim 1, wherein said first paired winding portion generates a low voltage and a second paired winding portion generates a high voltage.

3. An apparatus according to claim 2, wherein said first paired winding portion generates the low voltage when a power switch is turned on, and said second paired winding portion generates the high voltage in response to a predetermined sequence control signal from said selecting means.

4. An apparatus according to claim 1, wherein said selecting means selects power supply to said primary windings of said paired winding portions.

5. A power source apparatus comprising:
   a transformer having low and high voltage portions, said low voltage portion having a low voltage generating secondary winding and said high voltage portion having a high voltage generation secondary winding being wound around cores which are divided by a gap;
   driving means, connected to a primary winding of said transformer, for switching energization of said primary winding to cause said secondary winding to generate a voltage; and
   control means for controlling an output from said high voltage generation secondary winding, said control means being provided with a control winding arranged in said high voltage portion and current control means for controlling a current flowing through said control winding.

6. An apparatus according to claim 5, wherein said transformer includes independent primary windings in said low and high voltage portions.

7. An apparatus according to claim 6, further including selecting means for selecting power supply to one of said primary windings of said low and high voltage portions.

8. An apparatus according to claim 5, wherein said transformer includes a common primary winding in said low and high voltage portions.

9. An apparatus according to claim 5, wherein said current control means comprises detecting means for detecting an output from said high voltage generation secondary winding and comparing means for comparing a reference value with an output from said detecting means, whereby a current of said control winding is controlled in response to an output from said comparing means.

10. An apparatus according to claim 9, wherein said current control means comprises switching means for switching the reference value.

11. An apparatus according to claim 9, wherein said apparatus supplies power source voltages to image forming means, and said switching means switches the reference value in an image formation mode and a mode other than the image formation mode.

12. A power source apparatus comprising:
a transformer having a plurality of paired winding portions provided with primary and secondary windings wound around a plurality of cores divided by a gap;
driving means connected to said primary winding of said paired winding portion, for switching energization of said primary winding of said transformer to cause said secondary winding to generate a voltage; and
selecting means for selectively driving one of said plurality of paired winding portions, wherein said secondary windings of said second paired winding portion comprise a high voltage output winding and a high voltage control winding, said high voltage control winding being controlled to control an output from said high voltage output winding.

13. A power source apparatus for supplying electric power to each section of an electrophotographic apparatus, in response to a sequence signal, said power source apparatus comprising:
a converter transformer including a primary winding, a first secondary winding and a second secondary winding;
switching means for controlling energization of said primary winding;
first output means for outputting a first voltage according to an output from said first secondary winding during an ON time of said primary winding controlled by said switching means;
selection means responsive to the sequence signal related to an image formation for selecting a level of the first voltage outputted from said first output means; and
second output means for outputting a second voltage according to an output generated on said second secondary winding during an OFF time of said primary winding controlled by said switching means.

14. An apparatus according to claim 13, wherein said converter transformer comprises a third secondary winding for outputting a voltage during both the ON and OFF times of said primary winding.

15. An apparatus according to claims 13 or 14, wherein said first secondary winding generates a low voltage for a load.

16. An apparatus according to claims 13 or 14, wherein said second secondary winding generates a high voltage for a load.

17. A power source apparatus for supplying power to each section of an electrophotographic apparatus including an exposure means, said power source apparatus comprising:
a converter transformer including a primary winding, a first secondary winding, a second secondary winding and a third secondary winding;
switching means for controlling energization of said primary winding of said converter transformer;
first output means for causing said first secondary winding to output a voltage during an ON time of said primary winding controlled by said switching means; and
second output means for causing said second secondary winding to output a voltage during an OFF time of said primary winding controlled by said switching means, wherein said third secondary winding outputs a voltage to the exposure means during both the ON and OFF times of said primary winding.

18. An apparatus according to claim 13, wherein an AC load is connected between said third secondary winding and said exposure means.

19. An apparatus according to claim 18, wherein said AC load comprises an inductance.

20. A power source apparatus comprising:
a transformer having first and second paired winding portions of primary and secondary windings wound around a plurality of cores, wherein said plurality of cores comprise first and second core portions, and said plurality of cores being divided by a gap, said gap having a first gap portion in said first core portion on which the first paired winding portion is provided, and a second gap portion in said second core portion on which the second paired winding portion is provided, said second gap portion being larger than said first gap portion; and
driving means connected to said primary winding of said paired winding portion, for switching energization of said primary winding of said transformer to cause said secondary winding to generate a voltage, wherein said first paired winding portion generates a low voltage and said second paired winding portion generates a high voltage.

21. An apparatus according to claim 20, further comprising selecting means for selectively driving said second pair winding portion.

22. A power source apparatus for supplying electric power to each section of an electrophotographic apparatus, said power source apparatus comprising:
a converter transformer including a primary winding, a first secondary winding, a second secondary winding and a third secondary winding;
switching means for controlling energization of said primary winding of said converter transformer;
first output means for generating low voltage DC output in accordance with an output generated on said first secondary winding, during an ON time of said primary winding controlled by said switching means;
second output means for generating high voltage DC output in accordance with an output generated on said second secondary winding, during an OFF time of said primary winding controlled by said switching means; and
third output means for generating AC output, in accordance with an output generated on said third secondary winding, during the ON and OFF times of said primary winding controlled by said switching means.

23. An apparatus according to claim 22, wherein said first output means is adapted to supply electric power to a control section for sequence control of said electrophotographic apparatus.

24. An apparatus according to claim 22, wherein said second output means is adapted to supply electric power to charging means of said electrophotographic apparatus.

25. An apparatus according to claim 22, wherein said third output means is adapted to supply electric power to exposure means of said electrophotographic apparatus.

* * * * *

UNITED STATES PATENT AND TRADEMARK OFFICE
CERTIFICATE OF CORRECTION

PATENT NO. : 4,980,811

DATED : December 25, 1990

INVENTOR(S) : KOJI SUZUKI ET AL.

It is certified that error appears in the above-identified patent and that said Letters Patent is hereby corrected as shown below: TITLE PAGE:

AT [19] UNITED STATES PATENT

"Suzuji et al." should read --Suzuki et al.--.

AT [57] INVENTORS

"Koji Suzuji;" should read --Koji Suzuki;--.

AT [56] REFERENCES CITED

Attorney, Agent, or Firm,
"Fitzpatrick, Cella Harper & Scinto" should read
--Fitzpatrick, Cella, Harper & Scinto--.

COLUMN 1

Line 47, "and" should be deleted.

COLUMN 2

Line 25, "a voltage" should read --a high voltage--.
Line 46, "LC load" should read --AC load--.

COLUMN 4

Line 16, "section and" should read --section, and--.

COLUMN 8

Line 15, "lamp 7" should read --lamp 107--.
Line 48, "As" should read --An--.

UNITED STATES PATENT AND TRADEMARK OFFICE
CERTIFICATE OF CORRECTION

PATENT NO. : 4,980,811

DATED : December 25, 1990

INVENTOR(S) : KOJI SUZUKI ET AL.

It is certified that error appears in the above-identified patent and that said Letters Patent is hereby corrected as shown below:

COLUMN 9

Line 38, "generaged" should read --generated--.

COLUMN 12

Line 44, "ON" should read --ON--.
Line 63, "(dury ratio)" should read --(duty ratio)--.

COLUMN 13

Line 9, "bY" should read --by--.

COLUMN 14

Line 5, "an" should read --a--.

COLUMN 16

Line 19, "PWM circuit 2" should read --PWM circuit 302--.
Line 63, "ON" should read --ON--.

COLUMN 18

Line 4, "lower source" should read --power source--.
Line 5, "a" (second occurrence) should be deleted.
Line 17, "porion" should read --portion--.
Line 19, "said paired winding portion," should read
    --said first and second paired
     winding portions,--.
Line 27, "a" (first occurrence) should read --said--.

UNITED STATES PATENT AND TRADEMARK OFFICE
CERTIFICATE OF CORRECTION

PATENT NO. : 4,980,811

DATED : December 25, 1990

INVENTOR(S) : KOJI SUZUKI ET AL.

It is certified that error appears in the above-identified patent and that said Letters Patent is hereby corrected as shown below:

COLUMN 19

Line 25, "second" should read --plurality of--.
Line 26, "portion" should read --portions--.

COLUMN 20

Line 14, "claim 13," should read --claim 17,--.
Line 33, "said paired winding portion," should read --said first and second paired winding portions,--.
Line 41, "pair" should read --paired--.

Signed and Sealed this

Twenty-fifth Day of August, 1992

Attest:

DOUGLAS B. COMER

Attesting Officer     Acting Commissioner of Patents and Trademarks